L. A. WATSON.
SYSTEM OF ELECTRICAL DISTRIBUTION.
APPLICATION FILED SEPT. 19, 1919.
1,389,334.
Patented Aug. 30, 1921.
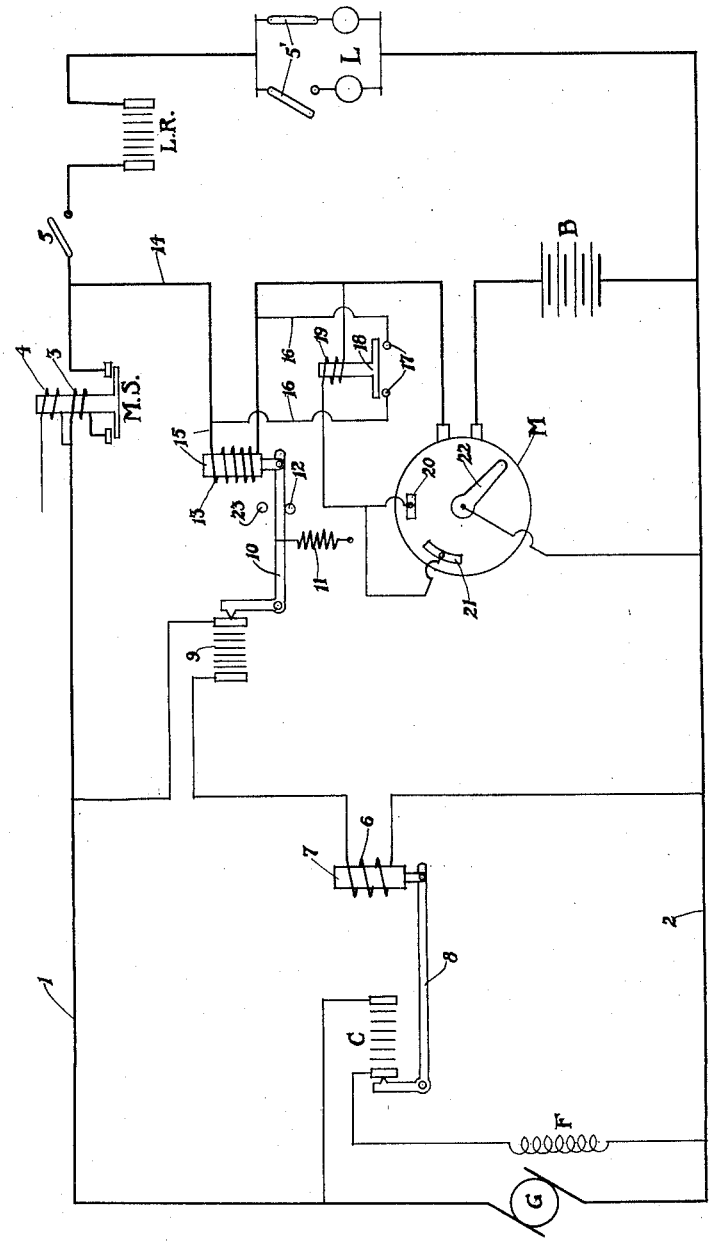
INVENTOR
BY
ATTORNEYS

UNITED STATES PATENT OFFICE.

LEONARD A. WATSON, OF BROOKLYN, NEW YORK, ASSIGNOR TO THE SAFETY CAR HEATING AND LIGHTING COMPANY, OF NEW YORK, N. Y., A CORPORATION OF NEW JERSEY.

SYSTEM OF ELECTRICAL DISTRIBUTION.

1,389,334.     Specification of Letters Patent.     Patented Aug. 30, 1921.

Application filed September 19, 1919. Serial No. 325,010.

*To all whom it may concern:*

Be it known that I, LEONARD A. WATSON, a citizen of the United States, residing at Brooklyn, in the county of Kings and State of New York, have invented certain new and useful Improvements in Systems of Electrical Distribution, of which the following is a full, clear, and exact description, such as will enable others skilled in the art to which it appertains to make and use the same.

This invention relates to systems of electrical distribution, and is more particularly directed to an improved railway car lighting system wherein an axle-driven variable speed generator is employed to charge a storage battery and lamps are adapted for connection to be supplied by the generator or by the battery.

It is an object of the invention to provide a simple and efficient regulating apparatus for a system of the character mentioned wherein the generator is controlled during the period of charging, and thereafter, to meet the various service requirements.

It is a further object to provide an improved car lighting system wherein the regulation of the generator is effected by a voltage-responsive coil tending to maintain substantial constancy of generator voltage as against speed changes and as against gradual changes in the counter E. M. F. of the battery during the period of charging, and wherein the value of voltage constancy is maintained at a reduced value at the end of charging sufficient to protect the battery against over-charge.

Another object is to provide a regulating apparatus for the purposes referred to which possesses features of structural superiority and functional advantage.

Other objects will be in part noted hereinafter in connection with the following description of the accompanying drawing, which illustrates an exemplary embodiment of the invention and wherein are represented various electrical instrumentalities employed and their circuit connections.

As shown, there is provided an axle-driven variable speed generator G having a shunt field winding F, the latter including in series therewith a variable resistance, such as a carbon pile C. The generator is adapted for connection by mains 1 and 2 with battery B and lamps L. A main switch MS is present to control the line 1 by the action of a series coil 3 and a voltage coil 4 designed to open the circuit while the generator voltage is below a predetermined value and to close the circuit when and while the generator voltage exceeds a predetermined value. A manual switch 5 may be employed in the lamp circuit, and additional individual lamp switches 5' utilized where desired. A lamp regulator including a resistance LR is also provided in the lamp branch to limit the voltage applied to the lamps when the latter are supplied by the generator or by the battery.

To control the output of the generator, the degree of compression of the carbon pile C is varied (with attendant variation of the strength of field winding F) by a regulator which may comprise or include a voltage coil 6 connected across the mains 1 and 2 and acting on a core 7 attached to bell crank 8, which latter acts against the pile C. The coil 6, when effective in regulating, tends to maintain substantial constancy of generator voltage as against speed changes and as against gradual changes in the counter E. M. F. of the battery. Coil 6 is further governed as to the value of voltage constancy to be maintained thereby, at intervals determined by the state of charge of the battery, to meet the contemporaneous requirements for the protection of the battery and the other elements of the system. To accomplish these ends, a variable resistance, such as a second carbon pile 9, is connected in series with the coil 6 and the degree of compression of the resistance 9 is governed by a bell crank 10 urged in one direction by a spring 11 against a stop 12 and moved in the other direction, under certain conditions, by a series coil 13 connected in the battery branch 14 and acting on a core 15 attached to the bell crank 10. Coil 13 may be short-circuited by a shunt 16 including contacts 17 arranged to be bridged or broken by a switch element 18, in turn governed by a voltage coil 19 adapted for connection across the battery B through an ampere hour meter M. The meter M is connected in the battery branch and designed to indicate the instant state of battery charge by measurement of the charging and discharging current, and may be provided with a fixed terminal contact 20, a fixed initial contact 21, and a center movable contact 22, which latter, for example, may travel counter-clockwise during battery charging and clockwise during battery discharging.

With one design of the system illustrated, its functional working may be briefly explained as follows: Assume the train at rest with the battery substantially depleted. Under these conditions meter contacts 21 and 22 will be in engagement and the circuit of coil 19 connected across the battery to raise the switch element 11 and break the shunt 16 so that subsequent charging current will energize the series regulating coil 13 for resistance 9. When the generator voltage thereafter re-builds and the main switch MS closes, charging current will be delivered to the battery, momentarily at a high rate, and core 15 will be raised against the counter-action of spring 11 to decrease the resistance of carbon pile 9 and thereby increase the relative effectiveness of regulator coil 6 so that the generator voltage will be lowered to restrain the output of the generator as supplied to the battery within pre-selected limits. As the charge progresses and the counter E. M. F. of the battery gradually increases to afford its own protection against an excessive generator output at the higher voltage of the system, the meter M moves to separate contacts 21 and 22, thereby breaking the circuit of coil 19 and releasing switch element 18 to bridge contact 17 and shunt the series coil 13, whereby bell crank 10 drops against stop 12, resistance 9 increases its damping effect on coil 6, and the voltage of the generator is thus raised to and maintained at a higher value of constancy to expedite the period required for completion of the battery charging. The last-described setting of the regulator obtains thereafter until the end of battery charging as indicated by the meter, whereupon meter contacts 20 and 22 become engaged to again complete the circuit of coil 19 and raise switch element 18 to break the shunt 16 and reënergize serial coil 13. This coil thereupon acts, if the preceding level of generator voltage effected final charging at a substantial rate, to compress the pile 9 and strengthen coil 6 to drop the generator voltage sufficient to reduce the current to the battery within non-injurious limits.

An upper stop 23 may be provided to limit the extent of movement of the bell crank 10 under the action of coil 13; and the movement of the bell crank may also be steadied by a dash pot, if desired. In practice, it would be advantageous to design carbon pile 9 and coil 6 so that, for example, with bell crank 10 urged against stop 12, the generator voltage would be maintained at about forty volts; and coil 13 and stop 20 might be so designed that, with the bell crank 10 against stop 23 (a condition obtaining at the commencement of charging) regulator coil 6 would be relatively strengthened to maintain a generator voltage of, for example, thirty-six volts. With this design, it will be observed, the final period of battery charging would occur while the generator voltage was held at its higher value and the battery current would taper off for inherent protection against over-charge, if the battery were normal. In the event, however, of a sub-normal battery or a battery to which an injurious over-charge would be delivered at a generator voltage of forty volts, the coil 13 becomes effective at the end of charging to drop the generator voltage to an intermediate value sufficient to protect the then sub-normal battery.

It is to be understood that certain features of the invention as shown and described are susceptible of modification and combination with systems wherein the regulator includes additional elements or elements of other character, and that such modifications and combinations can be effected without sacrifice of certain of the advantages of the present invention and without departure from the scope of the appended claims.

Having described my invention, what I claim as new and desire to secure by Letters Patent is:

1. In combination, a variable speed generator, a battery adapted for connection to be charged thereby, a regulator including a voltage coil tending when effective to maintain constancy of generator voltage as against speed changes and as against gradual changes in counter E. M. F. of said battery, a variable resistance in the circuit of said coil, a series coil in the battery branch adapted to control said resistance, and means including an ampere hour meter to render said series coil ineffective to control said resistance under certain conditions of battery charge.

2. In combination, a variable speed generator, a battery adapted for connection to be charged thereby, a regulator including a voltage coil tending when effective to maintain constancy of generator voltage as against speed changes and as against gradual changes in counter E. M. F. of said battery, a variable resistance in the circuit of said coil, a series coil in the battery branch adapted to control said resistance, and means including an ampere hour meter to render said series coil ineffective to control said resistance during an initial period of battery charging.

3. In combination, a variable speed generator, a battery adapted for connection to be charged thereby, a regulator including a voltage coil tending when effective to maintain constancy of generator voltage as against speed changes and as against gradual changes in counter E. M. F. of said battery, a variable resistance in the circuit of said coil, a series coil in the battery branch adapted to control said resistance, and means including an ampere hour meter to render said series coil ineffective to control said resistance during an initial period of battery charging and after substantial completion of charging.

4. In combination, a variable speed generator having a shunt field winding, a battery adapted for connection to be charged thereby, a regulator for the generator including a voltage coil tending when effective to maintain substantial constancy of generator voltage as against speed changes and as against gradual changes in the counter E. M. F. of said battery, a variable resistance in the circuit of said coil, electro-responsive means influenced under certain conditions by the charging current delivered to said battery to control said resistance, and means indicative of the state of battery charge by current measurement to govern the effectiveness of said electro-responsive means.

5. In combination, a variable speed generator having a shunt field winding, a battery adapted for connection to be charged thereby, a regulator for the generator including a voltage coil tending when effective to maintain substantial constancy of generator voltage, a variable resistance in the circuit of said coil, a series coil in the battery branch adapted under certain conditions to control said resistance, and means including a voltage coil and an ampere hour meter to govern the periods of control of said variable resistance by said series coil.

In testimony whereof I affix my signature, in the presence of two witnesses.

LEONARD A. WATSON.

Witnesses:
HELEN M. SEAMANS,
DAVID A. WOODCOCK.